United States Patent Office 3,099,668
Patented July 30, 1963

3,099,668
ORGANOTIN HYDROXIDES
Maurice L. Zweigle and Henry Tolkmith, Midland, Mich., assignors to The Dow Chemical Company, Midland, Mich., a corporation of Delaware
No Drawing. Filed Aug. 8, 1960, Ser. No. 47,933
12 Claims. (Cl. 260—429.7)

The present invention is concerned with novel organotin hydroxides and is particularly directed to compounds corresponding to the formula

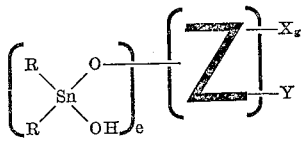

wherein Z represents the hydrocarbon radical of a phenolic compound, said radical having up to 2 benzene rings and up to 2 phenolic hydroxyls; each R independently represents phenyl or an alkyl group containing from 1 to 4, inclusive, carbon atoms; Y represents hydrogen or an alkyl group containing from 1 to 4, inclusive, carbon atoms; X represents chlorine, bromine, or nitro; the subscript letter $g$ represents an integer from 1 to 5, inclusive; all the positions on the hydrocarbon radical Z which are ortho- or para- to the ring position to which, through an oxygen atom, an organotin hydroxide moiety is attached having had their ring hydrogens replaced; any bridging structure whereby up to two benzene rings are bonded together being a hydrocarbon structure having a total of not more than 3 carbon atoms and having both benzene rings bonded to the same carbon atom; and the subscript letter $e$ represents an integer from 1 to 2, inclusive.

The present compounds are liquids or solids of very limited solubility in water, moderately soluble in many common organic solvents. They are useful in numerous agricultural applications. Specifically, the compounds are excellent fungicides for the control of saprobic and parasitic fungi, they are useful as insecticides, and in suitable applications they are selective herbicides. They are useful also for the control of internal parasites of warm-blooded animals and, when suitably exhibited, may be used as rodenticides.

These compounds are prepared by a general reaction between an organotin oxide compound and a phenol compound according to the scheme:

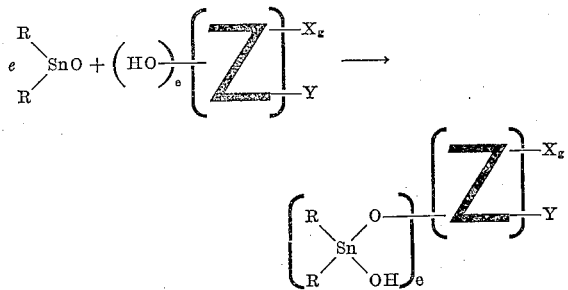

wherein R, X, Y, $g$ and $e$ have the values hereinbefore set forth.

It is essential and critical in the present invention that the phenolic starting compound represented by the formula have all its ring positions o- and p- to the phenolic hydroxyl group occupied by radicals or moieties other than hydrogen.

The reaction is conveniently carried out in a liquid reaction medium, and is moderately endothermic and goes forward smoothly at temperatures in the range of 30° to 150° C. Within the stated range, temperatures may vary or, if desired, may conveniently be regulated by employing a liquid reaction medium boiling at a desired reaction temperature wherein the reaction may be carried out by heating a reaction mixture to reflux. Good results are obtained when employing substantially chemical equivalent amounts of the organotin oxide and phenol compound. One phenolic hydroxyl group reacts with one organotin oxide group.

In carrying out the reaction, the organotin compound and phenolic compound (which may be a dihydroxybenzene compound) may be combined slowly, portionwise, in solvent and with stirring; or alternatively they may be combined as single portions with or without solvent, the addition of solvent being carried out, if desired, only immediately before the beginning of heating. The reaction may be carried out in any desired inert liquid reaction medium, such as methylene chloride, benzene, toluene, carbon tetrachloride, mixed technical dichlorobenzenes and the like. The reaction mixture comprising organotin oxide, phenol compound, and reaction medium is thereafter heated at a temperature in the reaction temperature range for a period of time to carry the reaction to the desired degree of completion.

Upon completion of the reaction, the desired product may be separated from the reaction mixture in various ways, conveniently by evaporation and removal of reaction medium. The resulting product may, if desired, be purified in known ways such as by fractional crystallization from solvent and the like.

The following examples illustrate the invention but are not to be considered as limiting it.

Example 1.—Dibutyl Pentachlorophenoxytin Hydroxide

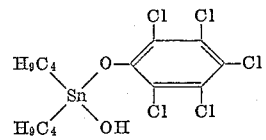

A mixture of 50 grams (0.2 mole) dibutyltin oxide and 53.2 grams (0.2 mole) of pentachlorophenol was dispersed with stirring in 250 milliliters methylene chloride. The resulting dispersion was thereafter heated at a temperature of 40°–42° C. and under reflux for approximately 2 hours to carry the reaction to completion. At the end of this time, the liquid reaction medium was removed by vaporization to obtain a white solid dibutyl pentachlorophenoxytin hydroxide product melting at 92°–96° C. and having, upon analysis, 21.29 percent tin and 33.97 percent chlorine by weight, as compared with 23.1 and 34.4 percent theoretical. The assigned structure was confirmed by infrared spectrum analysis.

Example 2.—Dibutyl 2,4,6-Trichlorophenoxytin Hydroxide

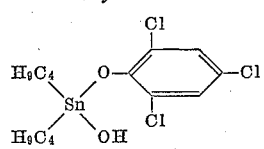

In procedures similar to those of Example 1, except that the starting phenol was 2,4,6-trichlorophenol, a dibutyl 2,4,6-trichlorophenoxytin hydroxide compound was prepared and found to occur as a very viscous oil which, upon standing at room temperature, very slowly solidified to a solid, melting at 94°–97° C. The product was found, upon analysis, to contain 26.72 percent tin and 23.32 percent chlorine, both by weight as compared with theoretical

*Example 3.—Dibutyl 2,4,6-Tribromophenoxytin Hydroxide*

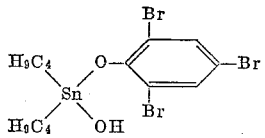

In procedures similar to those of Example 1, a dibutyl 2,4,6-tribromophenoxytin hydroxide compound was prepared from dibutyltin oxide and 2,4,6-tribromophenol. The reaction was carried out in toluene as reaction medium and under reflux at a temperature of 110° C., the boiling temperature of the reaction mixture, for 5 hours. The operation, upon removal of the liquid reaction medium yielded a tan solid product having a melting temperature of 78°–88° C. and containing 20.19 percent tin and 41.21 percent bromine, both by weight as compared with theoretical values of 20.5 and 41.4 percent respectively. The assigned structure was confirmed by infrared spectrum analysis.

In similar manner, by the employment of dimethyltin oxide and 2,4,6-tribromophenol there is obtained a white crystalline dimethyl 2,4,6-tribromophenoxytin hydroxide product.

*Example 4.—Dibutyl Pentabromophenoxytin Hydroxide*

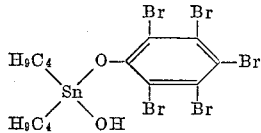

In procedures similar to those in Example 3, a mixture of dibutyltin oxide and pentabromophenol was heated under reflux together in boiling toluene at approximately 110° C. for 5 hours to obtain a dibutyl pentabromophenoxytin hydroxide product which was recrystallized from toluene to obtain a white, crystalline product melting at 120°–123° C., and found by analysis to contain 16.1 percent tin and 55.26 percent bromine, both by weight as compared with theoretical values of 16.1 and 54.2 percent respectively.

*Example 5.—Dibutyl 2,6-Dibromo-4-t-Butylphenoxytin Hydroxide*

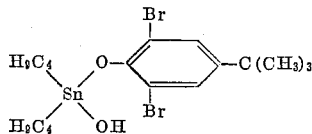

A mixture of 50 grams of dibutyltin oxide and 61.6 grams 2,6-dibromo-4-t-butylphenol was dispersed in 200 milliliters methylene chloride. The resulting reaction mixture was heated under reflux for 5 hours at 40°–42° C., the boiling temperature of the reaction mixture, to carry the reaction to completion. At the end of this time, heating was discontinued, the reflux apparatus disconnected, and the resulting mixture gently warmed to vaporize and remove solvent and obtain a solid white dibutyl 2,6-dibromo-4-t-butylphenoxytin hydroxide product melting at 138–141° C. The product was found, upon analysis, to contain 21.19 percent tin and 29.22 percent bromine, as compared with theoretical values of 21.4 and 28.7, respectively, all by weight.

*Example 6.—Dibutyl 2,4,6-Trinitrophenoxytin Hydroxide*

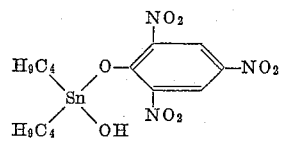

A mixture of 25 grams dibutyltin oxide and 25.2 grams 2,4,6-trinitrophenol (picric acid) was dispersed in 400 milliliters methylene chloride and the resulting mixture thereafter heated, under reflux, at the boiling temperature of the reaction mixture (40°–42° C.) for 2 hours to carry the reaction to completion. At the end of the reaction time, the reaction mixture was cooled, reflux apparatus was disconnected, and solvent removed by gentle vaporization to obtain 49.5 grams of a dibutyl 2,4,6-trinitrophenoxytin hydroxide product melting at 162°–164° C. The resulting product was found, upon analysis, to contain 23.7 percent tin and 8.37 percent nitrogen, compared with theoretical values of 24.8 percent and 8.8 percent respectively, all by weight.

*Example 7.—Diphenyl Pentachlorophenoxytin Hydroxide*

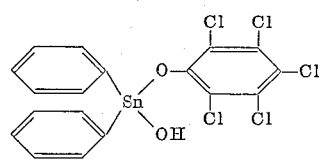

A mixture of 14.5 grams diphenyltin oxide (0.05 mole), 13.3 grams pentachlorophenol (slightly less than 0.05 mole) and 150 milliliters methylene chloride was heated under reflux at the boiling temperature of the solvent for 3 hours. Thereafter, reflux apparatus was disconnected and solvent was removed by vaporization to obtain a diphenyl pentachlorophenoxytin hydroxide product melting at 144°–146° C.

*Example 8.—Isopropylidenebis(2,6-Dichloro-p-Phenyleneoxy) Bis(Dibutyltin Hydroxide)*

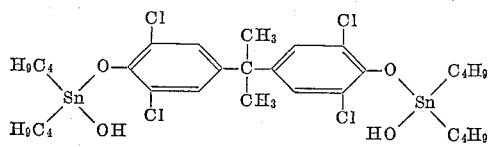

A mixture of 50 grams dibutyltin oxide and 36.6 grams 4,4'-isopropylidenebis(2,6-dichlorophenol) was dispersed in 200 milliliters methylene chloride. The resulting reaction mixture was heated at 40°–42° C. under reflux for 5 hours to carry the reaction to completion. At the conclusion of the reaction time reflux apparatus was disconnected and, by gentle heating, solvent was vaporized and removed. As a result of these operations there was obtained an isopropylidenebis(2,6-dichloro-p-phenyleneoxy) bis(dibutyltin hydroxide) product melting in the range of 180°–185° C. The product was found, upon analysis, to contain 29.29 percent tin and 17.92 percent chlorine as compared with theoretical values of 27.55 and 16.45, respectively, all by weight.

*Example 9.—Isopropylidenebis(2,6-Dibromo-p-Phenyleneoxy) Bis(Dibutyltin Hydroxide)*

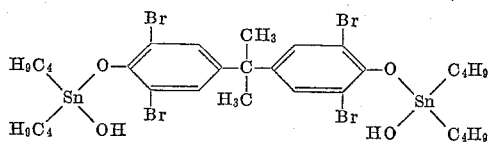

The present example was carried out essentially as the foregoing example except that, as starting phenol, there was employed a 4,4'-isopropylidenebis(2,6-dibromophenol). The resulting product melted in the range of 140°–145° C. The product was found, upon analysis, to contain 22.26 percent tin and 32.23 percent bromine as compared with theoretical values of 22.8 and 30.65 percent, respectively.

Similarly, when employing a 2,3,5,6-tetrachloro-1,4-dihydroxybenzene and dibutyl tin oxide, there is obtained a tetrachloro-p-phenylenedioxybis(dibutyltin hydroxide) product.

The organotin hydroxide compounds of the present invention are useful as insecticides, as selective herbicides, and are adapted to be employed for the control of fungal organisms parasitic upon desired plants as plant diseases. For such uses, the compounds may be employed directly. Alternatively, the compounds may be dispersed on inert finely divided solids and the resulting preparations employed as dusts. Also, such preparations may be dispersed in water with or without the aid of wetting agents and the resulting aqueous suspensions employed as sprays. In other procedures, the compounds may be employed in solvents or as constituents of solvent-in-water or water-in-solvent emulsions or as aqueous dispersions which may be applied by spray, drench, or wash. In a representative operation, an aqueous dispersion containing dibutyl 2,4,6-trichlorophenoxytin hydroxide at the rate of 2 pounds per hundred gallons of composition applied as a wetting spray gave 100% protection to a group of young tomato plants which were subsequently inoculated with viable spores of tomato late blight; whereas, a check population similarly inoculated but not protected by the present tin compound became heavily infested with the said organisms.

We claim:
1. Compound of the formula

wherein $e$ is an integer from 1 to 2, inclusive, each R independently represents a member of the group consisting of phenyl and an alkyl containing from 1 to 4, inclusive, carbon atoms; Y represents a member of the group consisting of hydrogen and an alkyl radical containing from 1 to 4, inclusive, carbon atoms; X represents a member of the group consisting of chlorine, bromine and nitro, $g$ is an integer from 1 to 5, inclusive;

Z represents an aromatic hydrocarbon radical having from 1 to 2 benzene rings and when said aromatic hydrocarbon radical has 2 benzene rings, said rings are connected by

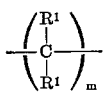

wherein $m$ is an integer of from zero to one, inclusive; wherein each $R^1$ is a member of the group consisting of H, $CH_3$ and $C_2H_5$, and wherein there is a total of up to 3 carbon atoms;

and all of the positions on the aromatic hydrocarbon radical which are ortho-, and all positions which are para- to any positions bonded to an organotin hydroxide moiety are substituted with a member of the group consisting of Cl, Br, $NO_2$, and alkyl.

2. Dibutyl pentachlorophenoxytin hydroxide.
3. Dibutyl 2,4,6-trichlorophenoxytin hydroxide.
4. Dibutyl 2,4,6-tribromophenoxytin hydroxide.
5. Dibutyl pentabromophenoxytin hydroxide.
6. Dibutyl 2,6-dibromo-4-t-butylphenoxytin hydroxide.
7. Dibutyl 2,4,6-trinitrophenoxytin hydroxide.
8. Diphenyl pentachlorophenoxytin hydroxide.
9. Isopropylidenebis(2,6 - dichloro-p-phenyleneoxy)bis (dibutyltin hydroxide).
10. Isopropylidenebis(2,6 - dibromo-p-phenleneoxy)bis (dibutyltin hydroxide).
11. A method of preparing a compound of the formula

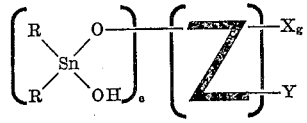

which comprises the steps of
(1) causing a reaction between a compound of the formula

and a compound of the formula

(2) and thereafter separating a compound of the formula

wherein $e$ is an integer from 1 to 2, inclusive, each R independently represents a member of the group consisting of phenyl and an alkyl containing from 1 to 4, inclusive, carbon atoms; Y represents a member of the group consisting of hydrogen and an alkyl radical containing from 1 to 4, inclusive, carbon atoms; X represents a member of the group consisting of chlorine, bromine and nitro, $g$ is an integer from 1 to 5, inclusive;

Z represents an aromatic hydrocarbon radical having from 1 to 2 benzene rings and when said aromatic hydrocarbon radical has 2 benzene rings, said rings are connected by

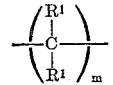

wherein $m$ is an integer of from zero to one, inclusive; wherein each $R^1$ is a member of the group consisting of H, $CH_3$ and $C_2H_5$, and wherein there is a total of up to 3 carbon atoms;

and all of the positions on the aromatic hydrocarbon radical which are ortho-, and all positions which are para- to any positions bonded to an organotin hydroxide moiety are substituted with a member of the group consisting of Cl, Br, $NO_2$, and alkyl.

12. The method of claim 11 wherein the reaction is carried out under reflux, at the boiling temperature of an inert organic liquid reaction medium whose reflux temperature is between 30° and 150° C.

References Cited in the file of this patent

UNITED STATES PATENTS

| | | |
|---|---|---|
| 2,583,084 | Burt | Jan. 22, 1952 |
| 2,626,954 | Albert | Jan. 27, 1953 |
| 2,867,641 | Ramsden | Jan. 6, 1959 |

OTHER REFERENCES

Harada: "Sci. Papers Inst. Phy. and Chem. Research" (Tokyo), 35 (1939), page 304.